United States Patent [19]

Nishi et al.

[11] Patent Number: 4,948,831
[45] Date of Patent: Aug. 14, 1990

[54] PROCESS FOR PREPARING POLYETHERIMIDE/EPOXYIMIDE RESIN COMPOSITION

[75] Inventors: Shiro Nishi, Tokorozawa; Shigekuni Sasaki, Iruma; Yoshinori Hasuda, Koganei, all of Japan

[73] Assignee: Nippon Telegraph and Telephone Corporation, Tokyo, Japan

[21] Appl. No.: 281,176

[22] Filed: Dec. 7, 1988

Related U.S. Application Data

[62] Division of Ser. No. 106,178, Oct. 7, 1987, Pat. No. 4,808,676.

[30] Foreign Application Priority Data

Oct. 11, 1986 [JP] Japan ................................ 61-241765
Dec. 19, 1986 [JP] Japan ................................ 61-303413

[51] Int. Cl.$^5$ ............................................ C08L 63/00
[52] U.S. Cl. .................... 524/500; 525/423; 525/436
[58] Field of Search ................. 525/423, 436; 524/500

[56] References Cited

U.S. PATENT DOCUMENTS

| | | | |
|---|---|---|---|
| 4,557,860 | 12/1985 | DiSalvo et al. ........................ | 525/423 |
| 4,604,230 | 8/1986 | Goswami et al. ..................... | 525/423 |
| 4,769,475 | 9/1988 | Sasaki et al. ........................ | 548/462 |
| 4,6752,398 | 3/1987 | Goswani et al. ..................... | 525/423 |

OTHER PUBLICATIONS

Sampe Quarterly, vol. 13, 1981, pp. 20-25.
L. H. Sperling, "Interpenetrating Polymer Networks and Related Materials", Plenum Press, N.Y., 1981, pp. 1-9.

*Primary Examiner*—Ana L. Carrillo
*Attorney, Agent, or Firm*—Frishauf, Holtz, Goodman & Woodward

[57] ABSTRACT

A process for the preparation of a polyetherimide/epoxyimide resin composition comprising (a) mixing a polyetherimide and an epoxyimide in a mixing ratio, by weight, of polyetherimide to epoxyimide of from 6:1 to 1:1 in a polar solvent to form a mixed resin composition, said polyetherimide being represented by the following formula of:

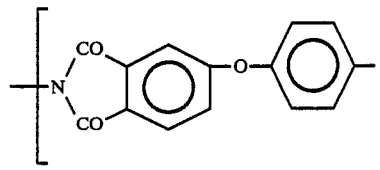

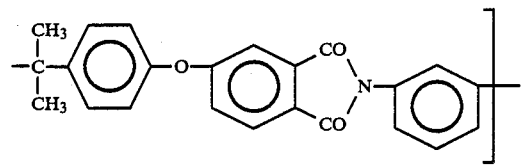

said epoxyimide being represented by the following general formula of:

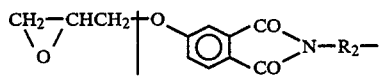

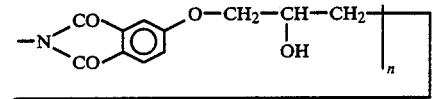

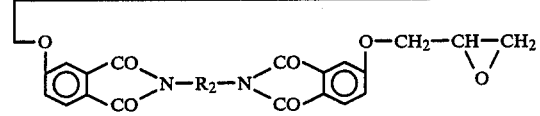

wherein n is an integer from from 0 to 10; and $R_2$ is a bifunctional organic radical residue selected from the group consisting of diphenylmethane, diphenyl ether, diphenyl sulfone, m-phenylene, p-phenylene and 1,6-hexamethylene; (b) molding said mixed resin composition prepared in the preceding mixing step, followed by removal of said polar solvent from the molded mixture; and (c) heating molded composition at a temperature of 100° C. to 300° C. for 1 to 3 hours.

4 Claims, 1 Drawing Sheet

PROCESS FOR PREPARING POLYETHERIMIDE/EPOXYIMIDE RESING COMPOSITION

This is a division of application Ser. No. 07/106,178 filed Oct. 7, 1987, now U.S. Pat. No. 4,808,676.

BACKGROUND OF THE INVENTION:

1. Field of Art

The present invention relates to a high quality polyetherimide/epoxyimide resin composition having a utility for various applications due to its improved resistance to heat, high adhesiveness at elevated temperature and low moisture permeability.

2. Statement of the Prior Art

Polyimides are generally excellent in thermal resistance (resistance to heat), and thus have been used as materials for space and aircraft applications. However, most of the known polyimides are prepared through polycondensation reactions, and water or other side-reaction products are produced during the polycondensation reactions. The other disadvantage of these known polyimide resins is that they are often insoluble in any solvent and also infusible, leading to poor moldability. In other words, difficulties are encountered in molding the known polyimide resins. On the other hand, epoxy resins are thermosetting resins or may be hardened by the use of hardeners, and may be easily molded. However, thermal resistivities of the known epoxy resins are not yet satisfactory.

It has been eagerly pursued to develop a resin composition which have the advantageous thermal resisting property of the polyimide resins together with the advantageous moldability of the thermosetting epoxy resins. One approach for achieving such an object is to introduce a chemical structure or chemical moiety which is expected to attribute for the improvement in molding property of the resultant resin into a certain polyimide, and another approach is to improve the thermal resistivity of an epoxy resin having excellent molding property.

Also known in the art is the utilization of polyimides as adhesives, while making use of their excellent thermal stabilities or resistivities. For example, SAMPE (Society for the Advancement of Material and Process Engineering), Quarterly Volume 13, pages 20 to 25 (October,1981), discloses an adhesive of polyimide system, which has a tensile shearing adhesive strength of not less than 100 kgf/cm$^2$ even at a high temperature. However, since the adhesive disclosed by the aforementioned prior art reference requires that it must be used at a temperature of not lower than 300° C for its use as an adhesive, the materials to be bonded thereby should withstand a temperature of not lower than 300° C. It is thus demanded to develop an adhesive which may be used as an adhesive having excellent thermal resistivities and yet can be applied at a moderately lower temperature for the exhibition of its adhesive property.

A further disadvantage of the polyimides is that they are relatively higher in moisture permeability when compared to those of the epoxy resins. Accordingly, when a polyamide is used to form an insulating layer in an electrical device or instrument, the coating layer tends to absorb moisture in the atmosphere to be lowered in its insulation resistance to cause occationally a problem of inferior connection or to induce corrosion of the electrodes. There is thus a demand for the development of a polyimide resin composition having low moisure permeability.

OBJECTS AND SUMMARY OF THE INVENTION

Accordingly, a primary object of this invention is to provide a polyetherimide/epoxYimide resin composition which is excellent in thermal resistivity and also excellent in moldability.

Another object of this invention is to provide a polyetherimide/epoxyimide resin composition which is excellent in adhesiveness and low in moisure permeability.

The polyimide resin of this invention is developed on the basis of the following principle. The polyimide resin of this invention may be prepared by mixing, for example, a polyetherimide having intramolecular repeating units each being represented by the following formula of:

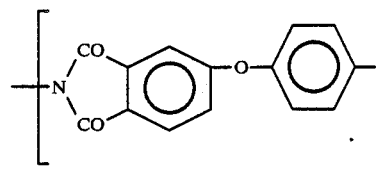

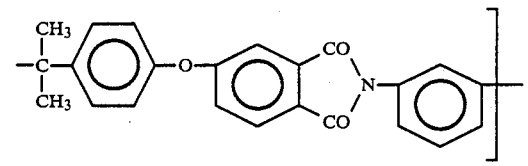

with an epoxyimide represented by the following general formula of:

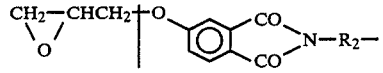

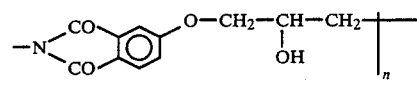

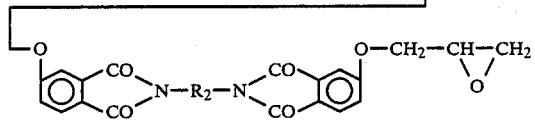

wherein R$_2$ is a difunctional organic radical residue, such as diphenylmethane, diphenyl ether, diphenyl sulfone, m-phenylene, p-phenylene and hexamethylene;

in a proper solvent and in an appropriate mixing ratio, followed by molding and subsequent thermal treatment of the molded product.

Since the epoxyimide is polymerized in the presence of the polyetherimide to form a high molecular weight polymer, the molecular chains originated from the polyetherimide and epoxyimide are interpenetrating with each other to form a stable high polymer having network structures. The present invention has been accomplished based on the finding that the chemical moieties or radical residues, 1.e. the polyetherimide and epoxyimide molecules, are not present in a blended structure, but the resultant high polymer behaves physically as though an integral mass of uniform structure.

It has hitherfore been estimated that in a resin having the so-called interpenetrating polymer networks (sometimes referred to briefly as IPN), not only the polymer component A and polymer component B constituting the IPN structure are present in the entangling or intertwining blended condition, but also the polymer chains of the components A and B are somehow bonded at some bridge formation points. (See L. H. Sperling, 'Interpenetrating Polymer Networks and Related Materials', Plenum Press, N.Y., 1981, pages 1 to 9.) The polyetherimide/epoxyimide resin composition of this invention has the properties of a uniform and stable polymer rather than the properties of a so-called blend resin composition, by subjecting the same to a proper thermal treatment or heating after it is molded to form, for example, a film or the like. To enhance the effect of thermal treatment, a hardener may be admixed thereto. Particularly important properties, provided by this invention, include the low moisture permeability, improved resistivity to heat, and strong adhesiveness in a high temperature environment. The term 'polyetherimide' or 'polyetherimide resin' as used throughout this specification means those having intramolecular repeating units each being represented by the following general formula (I) of:

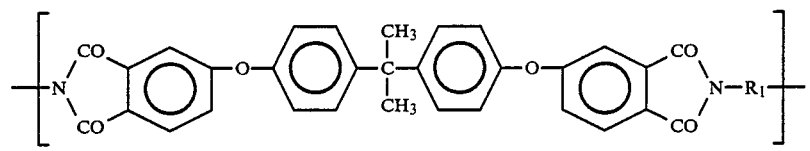

(I)

wherein $R_1$ is a radical residue selected from the group consisting of (a) an aromatic hydrocarbon residue having 6 to 20 carbon atoms or a halogenated derivative thereof; (b) an alkylene, a polyorganosiloxane which is terminated by a chain reaction terminating agent selected from alkylenes having 2 to 8 carbon atoms, or a cycloalkylene residue having 3 to 20 carbon atoms; and (c) a difunctional organic radical residue selected from those represented by the following general formula of:

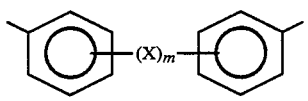

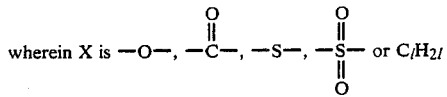

wherein X is $-O-$, $-\overset{O}{\underset{\|}{C}}-$, $-S-$, $-\overset{O}{\underset{\underset{\|}{O}}{\overset{\|}{S}}}-$ or $C_lH_{2l}$ where l is an integer of from 1 to 5, and m is zero or 1.

On the other hand, the term 'epoxyimide' or 'epoxyimide resin' as used herein means an epoxyimide represented by the following general formula (II) of:

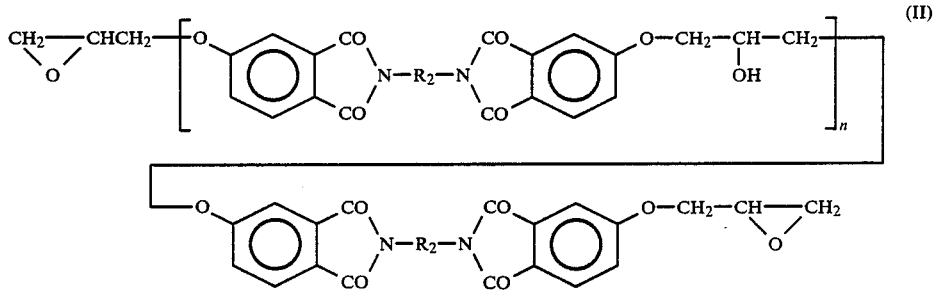

(II)

wherein n is an integer of from 0 to 10, and R2 is an aromatic hydrocarbon residue having 6 to 20 carbon atoms or a halogenated derivative thereof; (b) an alkylene, a polyorganosiloxane which is terminated by a chain reaction terminating agent selected from alkylenes having 2 to 8 carbon atoms, or a cycloalkylene residue having 3 to 20 carbon atoms; and (c) a difunctional organic radical residue selected from those represented by the following general formula of:

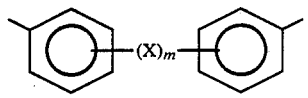

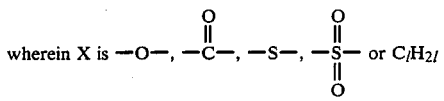

where l is an integer of from 1 to 5, and m is zero or 1.

The polyetherimide/epoxyimide resin composition of the invention is prepared by mixing intimately the aforementioned polyetherimide with the aforementioned epoxyimide in a polar solvent in a mixing ratio, by weight, of from 6'1 to 1'1. The polyetherimide/epoxyimide resin composition of the invention may be molded to form a thin film or other desired molded products through suitable molding processes. The thus molded products are subjected to thermal treatment to produce finished products which are low in moisture permeability, high in adhesive strength at elevated temperature and excellent in thermal resistivity. The polyetherimide/epoxyimide resin composition of the invention may be added with a hardener, a hardening accelerator or a filler, as desired.

Examples of the hardeners which may be added to the resin composition of this invention include carboxylic anhydrides such as phthalic anhydride, methylnadic anhydride, 4-methylhexahydrophthalic anhydride and trimellitic anhydride; amine base hardeners such as methylenediamine, diethylenetriamine, tetraethylenepentamine, m-phenylenediamine, diaminodiphenyl ether and diaminodiphenylmethane; polyamide base hardeners; and imidazole base hardeners such as 2-ethyl-4-methylimidazole and 2-methylimidazole; and hardeners represented by the general formula (III) of:

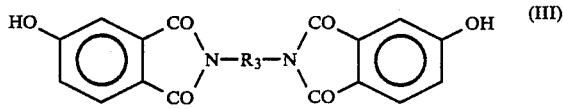

(III)

wherein $R_3$ is a radial residue selected from the group consisting of (a) an aromatic hydrocarbon residue having 6 to 20 carbon atoms or a halogenated derivative thereof; (b) an alkylene, a polyorganosiloxane which is terminated by a chain reaction terminating agent having 2 to 8 carbon atoms, or a cycloalkylene residue having 3 to 20 carbon atoms; and (c) a difunctional organic radical residue selected from those represented by the following general formula of:

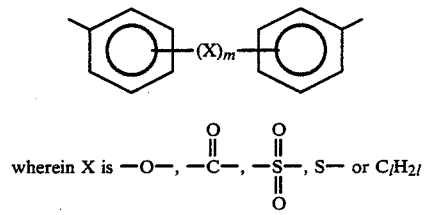

wherein X is $-O-$, $-\overset{O}{\underset{\|}{C}}-$, $-\overset{O}{\underset{\underset{O}{\|}}{\overset{\|}{S}}}-$, $S-$ or $C_lH_{2l}$ where l is an integer of from 1 to 5, and m is zero or 1.

Examples of the hardening accelerator which may be added to the resin composition of the invention include tertiary amines such as benzyldimethylamine, and boric esters and organic metal salts. Examples of the filler which may be added to the resin composition of this invention include diluents, modifiers, pigments, extenders and softeners for epoxy resins. Any solvents which dissolve the polyetherimide may be used, examples being amide solvents such as N,N-dimethylformamide, N,N-dimethylacetamide and N-methyl-2-pyrrolidone, and chlorinated hydrocarbon solvents such as chloroform and methylene chloride.

In the polyetherimide/epoxyimide resin composition of the invention, the polyetherimide should be mixed with the epoxyimide in a mixing ratio of from 6'1 to 1'1. A stable polymer cannot be formed if the mixing ratio is out of the defined range. Particularly when the amount of the polyetherimide is less than the defined range, the thermal resistivity of the resultant resin composition becomes inferior.

The resin composition of this invention may be prepared by admixing an epoxyimide with a polyetherimide generally dissolved in an organic solvent, followed by agitation at a temperature ranging from the room temperature to the boiling point of the used solvent, and then removing the solvent.

The epoxyimide used in the resin composition of this invention is a novel compound having a repeating unit in which two aromatic imide rings are present and also having reactive epoxy groups at both terminals, and thus differentiated from the conventional epoxyimides.

The novel epoxyimide used in the resin composition of this invention may be prepared by reacting epichlorohydrin with a bis(hydroxyphthalimide) represented by the following general formula (III) of:

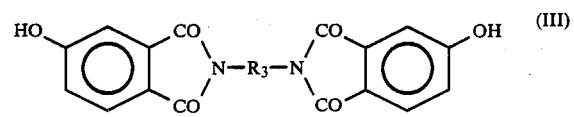

(III)

wherein $R_3$ is the same as defined above.

Specific examples of the bis(hydroxyphthalimide) are 1,3-bis(4-hydroxyphthalimide)benzene, 1,3-bis(4-hydroxyphthalimide)-4-chlorobenzene, 1,4-bis(4-hydroxyphthalimide)benzene, 4,4'-bis(4-hydroxyphthalimide)diphenyl ether, 4,4'-bis(4-hydroxyphthalimide)diphenyl sulfone, 4,4'-bis(4-hydroxyphthalimide)diphenylmethane, and 1,6-bis(4-hydroxyphthalimide)hexane.

One mol of bis(hydroxyphthalimide) is reacted with 1 to 2 mols of epichlorohydrin. Stoichiometrically excess amount of epichlorohydrin may be used in the reaction. Preferable solvents used in the reaction are those which dissolve bis(hydroxyphthalimide) and produced epoxyimide, the specific examples being epichlorohydrin and polar organic solvents such as N,N-dimethylacetamide, N,N-dimethylformamide and N-methyl-2-pyrrolidone.

The typical process for the preparation of an epoxy resin includes the step of using an aqueous solution of sodium hydroxide to proceed the reaction at a high temperature, for instance at 100° to 120° C. However, if the known process is applied for the preparation of the epoxyimide used in this invention, there is a risk that the imide group is partially hydrolysed. In order to obviate the partial hydrolysis, the reaction is carried out at a low temperature by the use of a quarternary ammonium salt or a metal hydride.

The reaction may proceed at a temperature ranging from the room temperature to 80° C. for an appropriate reaction time of from about 1 to about 50 hours. When a quarternary ammonium salt is used, it is necessary to remove hydrochloric acid in order to close epoxy rings, for example, by the use of a basic substance such as sodium methylate.

After the completion of the reaction, the reaction mixture is poured in water to dissolve the solvent and the side-reaction products, whereby the desired epoxyimide is precipitated. The precipitate is filtered off and rinsed with water or acetone to isolate a purified epoxyimide.

EXAMPLES OF THE INVENTION

Figure 1:
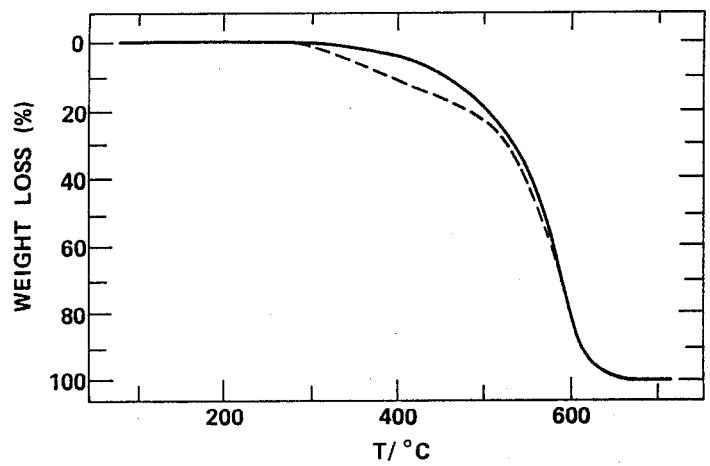
FIG. 1 is a graph showing the thermal decomposition curves of the polyetherimide/epoxyimide resin compositions of this invention and of a Comparative Example.

The present invention will now be described more specifically with reference to some examples thereof. However, it should be noted hereby that the following Examples are by way of example only, and the scope of the invention is only defined by the appended claims.

EXAMPLE 1

Into an Erlenmeyer flask, charged were 2.04g of 4,4'-bis(4-hydroxyphthalimide)diphenylmethane, 2.04g of benzyltrimethylammonium chloride and 27.18g of epichlorohydrin. The content in the flask was mixed together and agitated sufficiently at 60° C. The content in the flask was a yellowish brown solution at the initial stage, changed to a clear solution after the lapse of 2 hours, and then became cloudy after about 5 minutes. The cloudy solution was maintained at 60° C. while continuing agitation for additional 3 hours. Thereafter, the unreacted epichlorohydrin was distilled off at 70° C under reduced pressure. The resultant product was added with 25g of methanol and 15g of a 25% solution of sodium methylate in methanol, and agitated at the room temperature for 15 hours. The solution was poured into 300 ml of water. The pH value (hydrogen ion concentration) of the thus obtained aqueous solution was 10. The precipitate was filtered, and rinsed with water until the pH value of the filtered rinsing liquid took the value of 7. The precipitate was then rinsed with acetone and methanol, and then dried at 60° C. in vacuo for 48 hours. 2.26g (Yield: 97%) of an epoxyimide represented by the following structural formula was obtained.

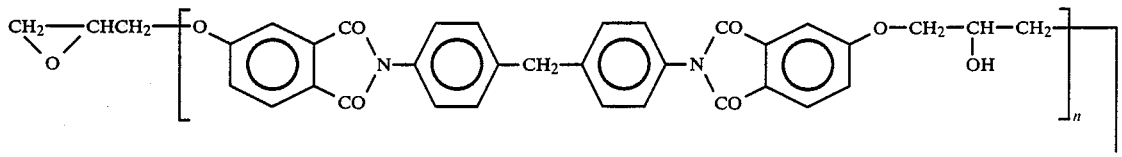

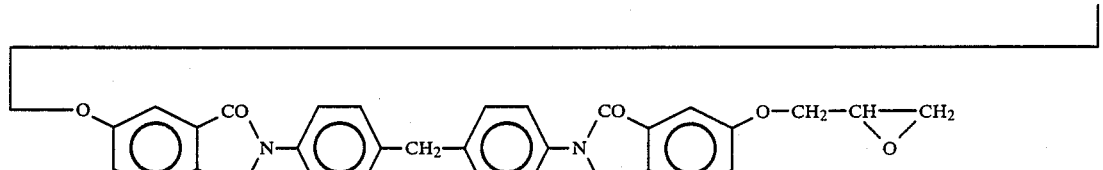

The infrared absorption spectrum of the product was examined to find an absorption peak at 915 cm$^{-1}$ due to the asymmetric stretching vibration of C—O bond of the epoxy ring

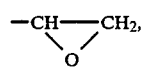

further characteristic absorption peaks at 1770 and 1720 cm$^{-1}$ due to C=O bond of the imide group, and an absorption peak at 1240 cm$^{-1}$ due to the stretching vibration of C—O—C bond of the

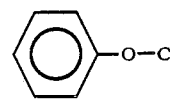

group. The result of ultimate analysis of the product was as follows.

|  | Carbon | Hydrogen | Nitrogen |
|---|---|---|---|
| Found: | 70.15 | 4.09 | 5.01 |
| Cald.: | 70.09 | 4.15 | 4.93 |

The epoxy equivalent of the product, determined by the hydrochloric acid/pyridine method was 710. This shows that the average value of n in the structural formula (II) is about 1.5.

0.5g of the epoxyimide was dissolved in N,N-dimethylacetoamide to form a 5 wt% solution to which 0.1g of triethyltetramine was added, and the admixed solution was cast into a mold. The thus obtained cast product was heated to 150° C for 2 hours to obtain a hardened product. The infrared absorption spectrum of the hardened product was inspected to confirm that the absorption peak at 915 cm$^{-1}$ found before heating disappeared. This showed that the epoxy ring was cleavaged or opened. The result of the determination of thermal decomposition temperature showed that the temperature at which the weight loss of the hardened product reached 50% was 522° C.

Similar procedures were repeated except that various bis(hydroxyphthalimide) derivatives were used in place of 4,4'-bis(4-hydrocyphthalimide)diphenylmethane. The results are shown in Table 1. Table 2 shows the residing weights (g) of the resultant epoxyimide resins, the epoxy equivalents and the thermal decomposition temperatures of the resultant epoxyimide resins which were prepared through the scale-up processes in which the charged amounts of the starting materials were increased.

TABLE 1

| Run No. | R$_2$ in Formula (II) | Epoxy Equivalent | Reaction Temperature (°C.) | Reaction Time (hrs) | Yield (%) |
|---|---|---|---|---|---|

TABLE 1-continued

| Run No. | R₂ in Formula (II) | | | | |
|---|---|---|---|---|---|
| 1 | -⟨C₆H₄⟩-CH₂-⟨C₆H₄⟩- | 710 | 60 | 5 | 97 |
| 2 | -⟨C₆H₄⟩-CH₂-⟨C₆H₄⟩- | 1060 | 80 | 48 | 83 |
| 3 | -⟨C₆H₄⟩-O-⟨C₆H₄⟩- | 650 | 60 | 5 | 89 |
| 4 | -⟨C₆H₄⟩-SO₂-⟨C₆H₄⟩- | 760 | 60 | 3 | 78 |
| 5 | -⟨C₆H₄⟩- (para) | 440 | 65 | 7 | 74 |
| 6 | -⟨C₆H₄⟩- (meta) | 430 | 62 | 24 | 52 |
| 7 | ⁺(CH₂)₆ | 390 | 65 | 6 | 57 |

| Run No. | R₂ in Formula (II) | Infrared Absorption Spectrum (cm⁻¹) | | | Result of Elementary Analysis Found (Calculated*) | | |
|---|---|---|---|---|---|---|---|
| | | $\nu\,C\!\!-\!\!\!-\!\!C$ / $O$ | $\nu C=O$ | $\nu\,C-O-C$ | C | H | N |
| 1 | -⟨C₆H₄⟩-CH₂-⟨C₆H₄⟩- | 915 | 1770 1720 | 1240 | 70.15 (70.09) | 4.09 (4.15) | 5.01 (4.95) |
| 2 | -⟨C₆H₄⟩-CH₂-⟨C₆H₄⟩- | 915 | 1770 1720 | 1240 | 70.21 (70.17) | 4.05 (4.11) | 5.03 (4.99) |
| 3 | -⟨C₆H₄⟩-O-⟨C₆H₄⟩- | 910 | 1770 1710 | 1240 | 67.69 (67.73) | 3.90 (3.80) | 4.93 (4.89) |
| 4 | -⟨C₆H₄⟩-SO₂-⟨C₆H₄⟩- | 910 | 1780 1720 | 1240 | 62.35 (62.48) | 3.56 (3.49) | 4.38 (4.52) |
| 5 | -⟨C₆H₄⟩- (para) | 910 | 1770 1720 | 1240 | 65,74 (65.69) | 3.80 (3.74) | 5.69 (5.75) |
| 6 | -⟨C₆H₄⟩- (meta) | 910 | 1780 1720 | 1240 | 65.74 (65.68) | 3.74 (3.75) | 5.78 (5.74) |

TABLE 1-continued

| 7 | $-(CH_2)_6-$ | 910 | 1770 | 1230 | 64.60 | 5.35 | 5.58 |
|---|---|---|---|---|---|---|---|
|   |   |   | 1720 |   | (65.62) | (5.31) | (5.60) |

Note:
*The theoretical value of the ultimate analysis was calculated on the basis of the epoxy equivalent.

TABLE 2

| Run No. | $R_2$ in Formula (II) | Charged Quantity (grams) | | | | | Yield (g) |
|---|---|---|---|---|---|---|---|
|   |   | Raw Material | ECH | Catalyst | $CH_3OH$ | $CH_3ONa$ |   |
| 1 | $-\langle O \rangle-CH_2-\langle O \rangle-$ | 600 | 7996 | 454 | 5600 | 4440 | 587 |
| 2 | $-\langle O \rangle-SO_2-\langle O \rangle-$ | 400 | 4837 | 275 | 4730 | 2380 | 407 |
| 3 | $-\langle O \rangle-O-\langle O \rangle-$ | 480 | 6372 | 362 | 5600 | 3151 | 492 |
| 4 | $-\langle O \rangle-O-\langle O \rangle-$ | 950 | 12610 | 716 | 6100 | 6236 | 995 |
| 5 | $-\langle O \rangle-O-\langle O \rangle-$ | 955 | 12620 | 717 | 6100 | 6236 | 950 |
| 6 | $-\langle O \rangle-O-\langle O \rangle-$ | 977 | 12980 | 728 | 5800 | 6346 | 1015 |
| 7 | $-\langle O \rangle-$ | 500 | 8163 | 464 | 6100 | 4018 | 251 |
| 8 | $-\langle O \rangle-$ (meta) | 735 | 12000 | 682 | 6100 | 5907 | 272 |

| Run No. | $R_2$ in Formula (II) | Condition for Reaction | | Purity (weight of residing mass) (100° C. × 2 hr) | Epoxy Equivalent (HCl-Pyridine) | Thermal Decomposition Temperature (TGA) TRR*: 10° C./min. | |
|---|---|---|---|---|---|---|---|
|   |   | Temperature (°C.) | Time (hrs) |   |   | 10% Loss | 50% Loss |
| 1 | $-\langle O \rangle-CH_2-\langle O \rangle-$ | 60 | 5 | 99.1 | 410 | 345 | 645 |
| 2 | $-\langle O \rangle-SO_2-\langle O \rangle-$ | 65 | 4 | 99.9 | 365 | 368 | 627 |
| 3 | $-\langle O \rangle-O-\langle O \rangle-$ | 60 | 5 | 99.8 | 339 | 378 | 617 |

TABLE 2-continued

| | | | | | | | |
|---|---|---|---|---|---|---|---|
| 4 | -C₆H₄-O-C₆H₄- | | 60 | 5 | 99.6 | 341 | 403 | 615 |
| 5 | -C₆H₄-O-C₆H₄- | | 60 | 5 | 99.7 | 339 | 403 | 615 |
| 6 | -C₆H₄-O-C₆H₄- | | 60 | 5 | 99.6 | 339 | 403 | 615 |
| 7 | -C₆H₄- | | 65 | 7 | 99.8 | 380 | 330 | 635 |
| 8 | -C₆H₃(CH₃)- | | 60 | 36 | 99.9 | 267 | 338 | 680 |

Note:
(1) The charged quantities of epichlorohydrin (ECH), benzyltrimethylammonium chloride (serving as a catalyst) and sodium methylate (CH₃ONa) were chared in ratio by equivalent, based on aunit equivalent of the raw material.
(2) CH₃ONa was added in the form of a 28% solution in CH₃OH.
*TRR = Temperature Raising Rate

EXAMPLE 2

2.05g of 4,4'-bis(4-hydroxyphthalimide)diphenylmethane was dissolved in 20.23g of dehydrated N,N-dimethylacetoamide (which had been dried with phosphor pentaoxide for 24 hours, and then distilled under reduced pressure), and added with 1.02g of sodium hydride (Absolute, 60% oily) followed by agitation at the room temperature for 14 hours. The solution was further added with 25.44g of epichlorohyrin and reacted at 55° C. for 6 hours. The solution was then poured into 300 ml of water and the resultant precipitate was filtered. The precipitate was rinsed with water until the pH value of filtered rinsing water reached pH 7. The precipitate was further rinsed with acetone and hexane, and then dried at 60° C. for 48 hours in vacuo 2.16g (Yield' 91%) of the same epoxyimide represented by the structural formula set forth in Example 1 was obtained.

The infrared absorption spectrum of the product of this Example was similar to that of the product obtained by Example 1. Elementary analysis of the product was conducted similarly as in Example 1. The epoxy equivalent of the product was 820, and the average value of n in the structural formula was found to be about 1.9.

The resultant epoxyimide was hardened, similarly as in Example 1, by the use of triethyltetramine to form a hardened product. The temperature at which the weight loss of the hardened product reached 50% was 513° C.

Likewise in Example 1, modified epoxyimides were prepared by using various bis(hydroxyphthalimide) in place of 4,4'-bis(hydroxyphthalimide)diphenylmethane. The conditions for the preparation and the results of tests conducted on the resultant products are shown in Table 3.

TABLE 3

| | | | | | | Infrared Absorption Spectrum (cm⁻¹) | | | Analysis Found Result (Calculated) Elementary | | |
|---|---|---|---|---|---|---|---|---|---|---|---|
| Run No. | R₂ in Formula (II) | Epoxy Equivalent | Reaction Temperature (°C.) | Reaction Time (hrs) | Yield (%) | $\nu C\underset{O}{\overset{}{\diagdown}}C$ | $\nu C=O$ | $\nu C-O-C$ | C | H | N |
| 1 | -C₆H₄-CH₂-C₆H₄- | 820 | 55 | 6 | 91 | 915 | 1770 1720 | 1240 | 70.05 (70.10) | 4.21 (4.13) | 4.88 (4.95) |
| 2 | -C₆H₄-CH₂-C₆H₄- | 790 | 60 | 4.5 | 92 | 915 | 1770 1720 | 1240 | 70.11 (70.09) | 4.07 (4.14) | 5.01 (4.94) |
| 3 | -C₆H₄-O-C₆H₄- | 880 | 55 | 7 | 84 | 910 | 1770 1710 | 1240 | 67.69 (67.78) | 3.83 (3.76) | 4.97 (4.95) |

TABLE 3-continued

| Run No. | R₂ in Formula (II) | Epoxy Equivalent | Reaction Temperature (°C.) | Reaction Time (hrs) | Yield (%) | Infrared Absorption Spectrum (cm⁻¹) $\nu C\!\!-\!\!\!\overset{\diagup O\diagdown}{\phantom{x}}\!\!\!-\!\!C$ | $\nu C=O$ | $\nu C-O-C$ | Analysis Found Results of Elementary C | H | N |
|---|---|---|---|---|---|---|---|---|---|---|---|
| 4 | —⟨⟩—SO₂—⟨⟩— | 860 | 80 | 21 | 58 | 910 | 1780 1720 | 1240 | 62.45 (62.43) | 3.54 (3.48) | 4.57 (4.54) |
| 5 | —⟨⟩— | 450 | 64 | 18 | 93 | 910 | 1770 1720 | 1240 | 65.61 (65.67) | 3.72 (3.73) | 5.79 (5.76) |
| 6 | —⟨⟩— | 420 | 63 | 7 | 78 | 910 | 1780 1720 | 1240 | 65.76 (65.69) | 3.80 (3.75) | 5.66 (5.73) |
| 7 | ‒(CH₂)₆‒ | 420 | 70 | 4 | 67 | 910 | 1770 1720 | 1230 | 64.60 (65.63) | 5.27 (5.30) | 5.71 (5.63) |

Note:
*The theoretical value of the ultimate analysis was calculated on the basis of the epoxy equivalent.

EXAMPLE 3

A mixture was prepared by mixing 3.0g of a polyetherimide (hereinafter referred to as 'PEI') having a repeating unit represented by the following structural formula of:

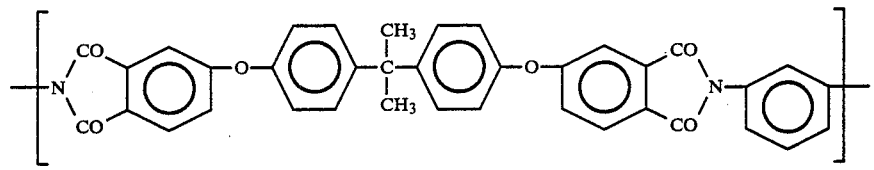

with 20g of N,N-dimethylacetoamide (hereinafter referred to as 'DMA') and 1.0g of an epoxyimide (having an average value of n of about 1.5) represented by the following structural formula of:

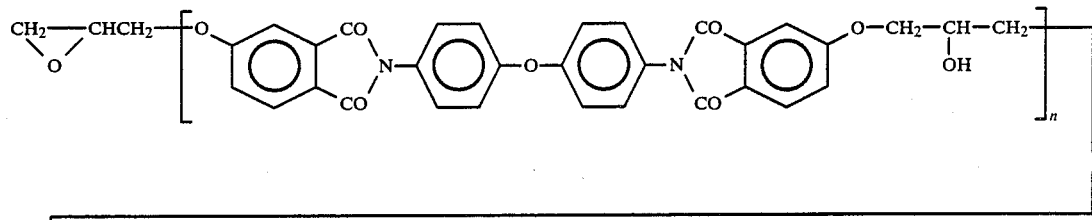

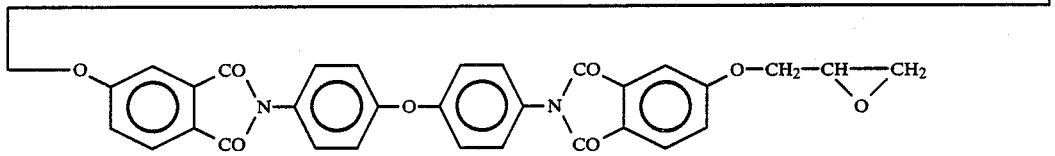

The mixture was agitated at 80° C. for 3 hours. The resultant reaction solution was allowed to flow over a glass plate, followed by removal of the solvent, to form a film.

A test piece for the determination of tensile shearing adhesion strength was prepared from the film.

The tensile shearing adhesion strength was tested in accordance with the JIS K 6850 Method. Surfaces of steel strips ground by using the No. 240 grinding paper were wiped with a cloth impregnated with methanol, and then the steel strips were dipped in trichloroethylene and subjected to ultrasonic wave rinsing for 30 minutes. The test piece was sandwiched between the rinsed steel strips so that the adhesion area between the surfaces of the film and the surfaces of the steel strips was set to the area as stipulated by JIS K 6850. The test piece sandwiched between the steel strips was allowed to stand in a thermostat maintained at 200° C. for 2 hours while applying with a pressure of about 2 kg/cm². Then, the test piece was withdrawn from the thermostat, and allowed to stand for a period of more than 3 hours in a test chamber maintained at 20° C. and 65% RH (Relative Humidity). The tensile strength of the test piece was then measured at 20° C. and at a pulling rate of 10 mm/minute.

Separately, a test specimen for the determination of thermal decomposition temperature was prepared from the same film, and the thus prepared test specimen was subjected to thermal treatment. The thermal decomposition temperature was shown by the temperature at which the weight of the test specimen was decreased by 10% as the temperature thereof was raised at a rate of 10° C./minute.

Generally following to the procedure as described in Example 1, modified mixtures were prepared by mixing the PEI as described above with various epoxyimides having difunctional radical residues $R_2$, respectively, of diphenylmethane, diphenyl sulfone, 1,4-phenylene, 1,3-phenylene and 1,6-hexamethylene, and by varying the mixing ratios between the PEI and the epoxyimides.

In the following Table 4, the substituent groups $R_2$ in the general structural formula (II) representing the epoxyimides are shown together with the mixing ratios (by weight) of PEI mixed therewith, and the adhesive strengths and thermal decomposition temperatures (10% weight loss) of the resultant films.

Comparative Example 1 shown in Table 4 was prepared as follows. 0.9g of the same PEI used in Example 3 was mixed with 8.1g of N,N-dimethylformamide and the mixture was agitated at 80° C to prepare a PEI solution. The PEI solution was added with 0.9g of an epoxy resin (Epikote 828: Trade Name of YUKA SHELL EPOXY Co., Ltd.). After agitating at the room temperature, the admixture was allowed to flow over an aluminium plate and then dried at 100° C. for 30 minutes to form a film. The thermal decomposition temperature of the film was 274° C.

TABLE 4

| Run No. | $R_2$ in Formula (II) | Mixing Ratio of PEI/PI* | Adhesive Strength (kgf/cm$^2$) | Thermal Decomposition Temperature (°C.) |
| --- | --- | --- | --- | --- |
| 1 | -C$_6$H$_4$-O-C$_6$H$_4$- | 3:1 | 262 | 436 |
| 2 | -C$_6$H$_4$-CH$_2$-C$_6$H$_4$- | 3:1 | 160 | 438 |
| 3 | -C$_6$H$_4$-SO$_2$-C$_6$H$_4$- | 3:1 | 72.3 | 462 |
| 4 | -C$_6$H$_4$- (1,4-phenylene) | 3:1 | 17.5 | 422 |
| 5 | -C$_6$H$_4$- (1,3-phenylene) | 3:1 | 61.6 | 368 |
| 6 | $-(CH_2)_6-$ | 3:1 | 205 | 405 |
| 7 | -C$_6$H$_4$-O-C$_6$H$_4$- | 4:1 | 179 | 455 |
| 8 | -C$_6$H$_4$-O-C$_6$H$_4$- | 2:1 | 191 | 450 |
| 9 | -C$_6$H$_4$-O-C$_6$H$_4$- | 1:1 | 215 | 424 |
| Comp. Ex. | — | — | 210 | 274 |

*Note:
PEI/EI = Polyetherimide/epoxyimide

The weight losses of the polyetherimide/epoxyimide resin compositions at different temperatures of the present invention were determined, and thermal decomposition curves were plotted based on the thus obtained data. Differential scanning calorimetric curves (DSC curves) of various samples were also plotted, as will be shown in FIG. 2 and described in detail hereinafter.

The thermal decomposition curves are shown in FIG. 1, wherein the test results of an embodiment of the polyetherimide/epoxyimide resin composition of the invention (PEI/EIDDE shown by the real line) and of a resin composition prepared by using a polyetherimide and a conventional epoxy resin (Epikote 828; PEI/DBA shown by the broken line; with DDM as hardener) are shown. As shown FIG. 1, the resin composition of the invention exhibits superior thermal stability as compared to the conventional resin composition.

Figure 2:
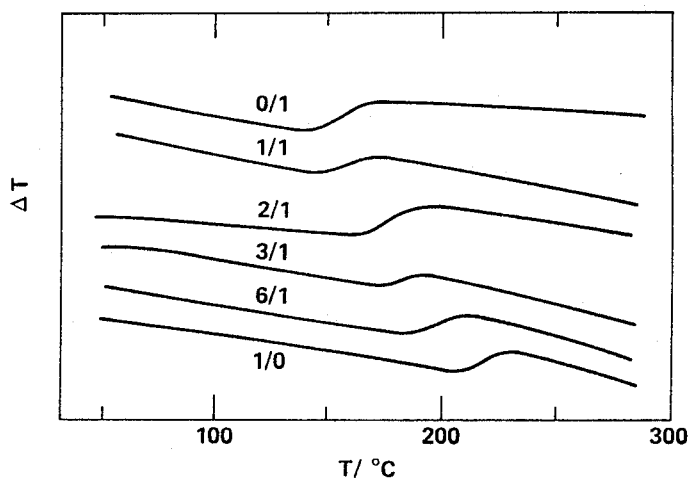
FIG. 2 is a graph showing the DSC curves (differential scanning calorimetric curves) of the polyetherimide/epoxyimide resin compositions prepared in accordance with the invention.

FIG. 2 is a graph showing the results of DSC curves (differential scanning calorimetry curves) of the embodiments of the invention wherein an epoxyimide (EIDDE) having diphenyl ether as the difunctional radical residue $R_2$ were mixed with a polyetherimide while varying the mixing ratio therebetween. The measurements were conducted at a temperature raising rate of 20° C./minute in a nitrogen atmosphere. The fractional expressions attached to the curves show the mixing ratios by weight of the components in respective compositions. As will be seen from FIG. 2, each of the resin compositions has a single glass transition temperature, and the glass transition temperatures of respective compositions are shifted towards higher temperature as the content of polyetherimide is increased. The results show that the epoxyimide and the polyetherimide are uniformly mixed with each other in each of the resin compositions.

The thermal decomposition temperature of the resin composition, prepared in accordance with the present invention, is high. Embodiments of the invention prepared by using epoxyimides having different $R_2$ in the formula (II) in combination with a polyetherimide were tested to find the thermal decomposition temperatures thereof. The results are shown in Table 5. Also shown in Table 5 are the adhesive strengths of the embodiments measured at 150° C.

As will be seen from the results set forth in Table 4, when a polyetherimide is combined with the same epoxyimide with the mixing ratio therebetween being varied, the thermal decomposition temperature becomes higher as the content of polyetherimide is increased.

As will be apparent from the results set forth in Table 4, the resin compositions prepared by using epoxyimides having, respectively, diphenyl ether and diphenylmethane as the group $R_2$ in the structural formula (II) are particularly improved in tensile strength measured at 10° C.

EXAMPLE 4

The film prepared by Example 3 was subjected to thermal treatments while changing the conditions for the thermal treatments, and the tensile adhesive strengths and the thermal decomposition temperatures of the resultant treated films were determined. The film was allowed to stand in a thermostat maintained at 250° C., and the time contained in the thermostat was changed to one hour. The test for the determination of tensile adhesion strength was conducted at 150° C.

The results are shown in Table 5. Table 5 show the adhesive strengths and the thermal decomposition temperatures of the test speciments of the embodiments of this invention, after they were subjected to heating at 250° C for one hour, which were prepared by using epoxyimides having different group $R_2$ in the structural formula (II).

As will be seen from Tables 4 and 5, it has been understood that the adhesive strength and the heat resistivity of the product are significantly changed by the change of the group $R_2$ in the used epoxyimide. The resin composition prepared in combination of the polyetherimide with an epoxyimide having intramolecular group of 4,4'-diphenyl ether have excellent properties. This particularly preferred embodiment exhibits an excellent adhesive property which is superior over that of the Comparative Example in which the polyetherimide is combined

TABLE 5

| Run No. | $R_2$ in Formula (II) | Mixing Ratio of PEI/PI* | Adhesive Strength (kgf/cm$^2$) | Thermal Decomposition Temperature (°C.) |
| --- | --- | --- | --- | --- |
| 1 | —⌬—O—⌬— | 3:1 | 99.1 | 468 |
| 2 | —⌬—CH$_2$—⌬— | 3:1 | 114 | 452 |
| 3 | —⌬—S(=O)$_2$—⌬— | 3:1 | 61.4 | 473 |
| 6 | ⁺(CH$_2$)$_6$ | 3:1 | 29.3 | 386 |
| 8 | —⌬—O—⌬— | 2:1 | 103 | 473 |

TABLE 5-continued

| Run No. | R₂ in Formula (II) | Mixing Ratio of PEI/PI* | Adhesive Strength (kgf/cm²) | Thermal Decomposition Temperature (°C.) |
|---|---|---|---|---|
| 9 | 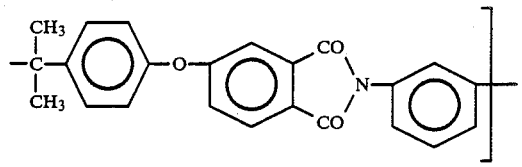 | 1:1 | 151 | 422 |
| Comp. Ex. | — | — | 53 | 274 |

Note:
*PEI/EI = Polyetherimide/epoxyimide
*The same epoxyimide and the same polyetherimide were used as used in Run Nos. set forth in Table 4.
*Film Heating Condition: 250° C., one hour, while applying a pressure of 2 kg/cm²
*Thermal Decomposition Temperature was indicated by the temperature at which the weight loss reached 10% of the initial weight of the product.
*The composition of the comparative Example was the same as that set forth in Table 4.

with a commercially available epoxy resin. When the same epoxyimide (having the same R₂ in the structural formula (II)) is combined with the same polyetherimide, the adhesive strength is improved by increasing the content or mixing ratio of epoxyimide, as will be exemplarily seen from the result of Run No. 9 where the mixing ratio of the polyetherimide to the epoxyimide is 1:1.

Even at an elevated temperature, drop in adhesive strength of the product obtained from the resin composition, according to this invention, is smaller than that of the Comparative Example.

EXAMPLE 5

A mixture was prepared by mixing 10.0g of a polyetherimide having a repeating unit represented by the following formula of:

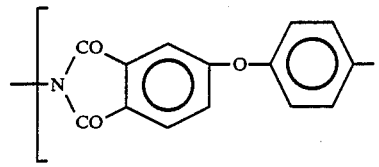

with 10.0g of an epoxyimide (having an average value of n of about 1.5) represented by the following structural formula of:

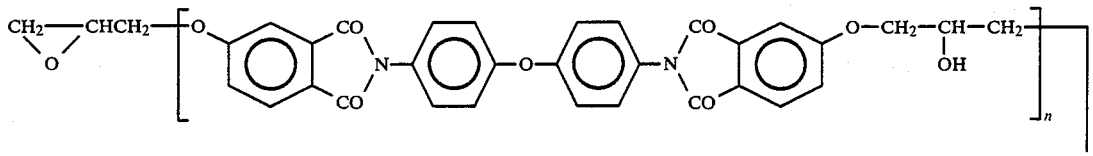

-continued

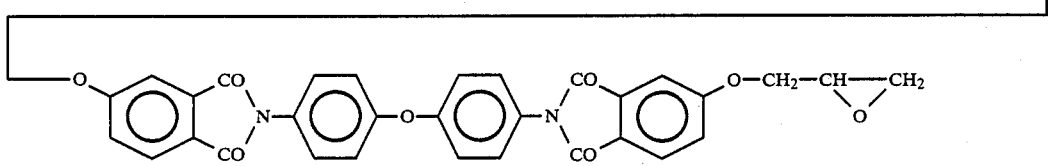

and 50.0g of N-methyl-2-pyrrolidone (hereinafter referred to as 'NMP'), and the mixture was agitated at 80° C. for 3 hours. The resultant solution was mixed with 3.0g of 4,4'-diaminodiphenylmethane (hereinafter referred to as 'DDM'). The admixture was agitated at the room temperature for additional 10 minutes, and then allowed to flow over an aluminium foil which was rotated at 200 rpm. The coating formed on the aluminium foil was dried by blowing hot air of 100° C. for one hour, and then heated to 150° C. for one hour, whereby a film was formed. The water vapor permeability through the thus formed film was measured by a method conducted generally in accordance with the ASTM E-96 Method.

Separately, films were prepared by varying the amount of PEI added to an epoxyimide having intramolecular diphenyl ether residue as the group R₂ and by adding, as a hardener, 4,4'-diaminodiphenylmethane or 4,4'-(4-hydroxyphthalimide)diphenyl ether, followed by heating treatment. Films were prepared similarly as described in the preceding passage, except that no hardener was added. The water vapor permeability through each of the heat-treated films were measured. The results are shown in Table 6.

As a Comparative Example, a film was prepared from a composition containing the same polyetherimide and polypyromellitimide (produced by Du Pont, Trade Name: Kapton). The water vapor permeation through the film of the Comparative Example was also measured, the result being set forth in Table 6.

As will be apparent from Table 6, the polyimide resin compositions, according to this invention, give films which are low in water vapor permeability.

TABLE 6

| Run No. | PEI/EI* (wt. ratio) | Condition for Heat Treatment (°C. × hr.) | Hardner | Water Vapor Permeability ($10^{-12}$ gcm/ cm$^2$ScmHg) |
|---|---|---|---|---|
| 10 | 1:1 | 150 × 1 | DDM*(3.0 g) | 28 |
| 11 | 2:1 | 200 × 1 | None | 22 |
| 12 | 3:1 | 200 × 2 | None | 29 |
| 13 | 3:1 | 220 × 3 | BHPI*(10 g) | 27 |
| 14 | 6:1 | 220 × 3 | BHPI*(10 g) | 27 |
| PEI* | 1:0 | — | None | 47 |
| Kapton | — | — | None | 39 |

Note:
*PEI: Polyetherimide
*EI: Epoxyimide
*DDM:

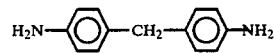

*BHPI:

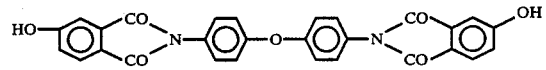

*The added amount of the hardeners are indicated by weight, based on 10 g of epoxyimide.

What is claimed is:

1. A process for the preparation of a polyetherimide/epoxyimide resin composition comprising:
   (a) mixing a polyetherimide and a epoxyimide in a mixing ratio, by weight, of polyetherimide to epoxyimide of from 6:1 to 1:1 in a polar solvent to form a mixed resin composition, said polyetherimide being represented by the following formula of:

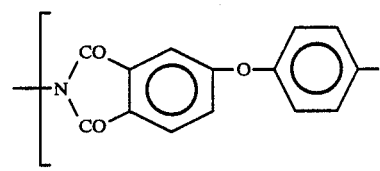

said epoxyimide being represented by the following general formula of:

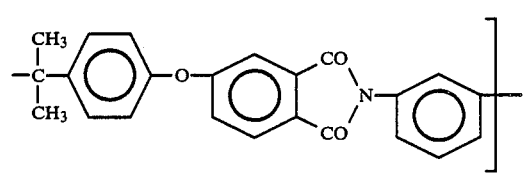

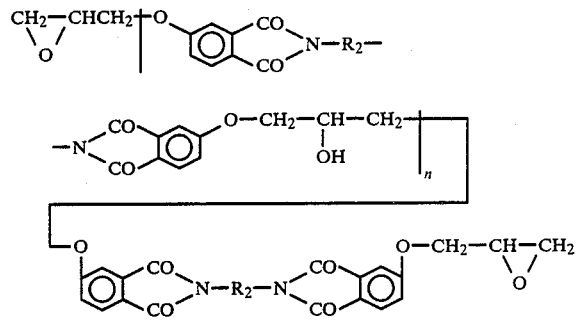

wherein n is an integer of from 0 to 10; and $R_2$ is a bifunctional organic radical residue selected from the group consisting of diphenylmethane, diphenyl ether, diphenyl sulfone, m-phenylene, p-phenylene and 1,6-hexamethylene;
   (b) molding said mixed resin composition prepared in the preceding mixing step, followed by removal of said polar solvent from the molded mixture; and
   (c) heating molded composition at a temperature of from 100° C. to 300° C. for 1 to 3 hours.

2. The process for the preparation of a polyetherimide/epoxyimide resin composition, according to claim 1, wherein there is added to the solution of said mixed resin composition of said polyetherimide and said epoxyimide, 30 to 10 wt% of either one or a mixture of diaminediphenylmethane and 4,4'-(4-hydroxyphthalimide)diphenyl ether.

3. The process for the preparation of a polyetherimide/epoxyimide resin composition, according to claim 1, wherein said epoxyimide is prepared by the condensation reaction between a bis(hydroxyphthalimide) and epichlorohydrin in the presence of benzyltrimethylammonium chloride which serves as a condensation catalyst, said bis(hydroxyphthalimide) being represented by the following general formula (III) of:

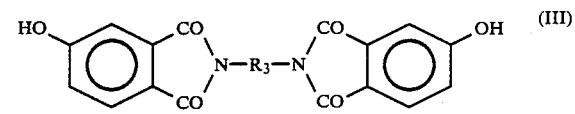

wherein $R_3$ is a bifunctional organic radical residue selected from the group consisting of diphenylmethane, diphenyl ether, diphenyl sulfone, m-phenylene, p-phenylene and 1,6-hexamethylene.

4. The process for the preparation of a polyetherimide/epoxyimide resin composition, according to claim 1, wherein said epoxyimide is prepared by the condensation reaction between a bis(hydroxyphthalimide) and epichlorohydrin in a polar solvent and in the presence of sodium hydride which serves as a condensation catalyst, said bis(hydroxyphthalimide) being represented by the following general formula (III) of:

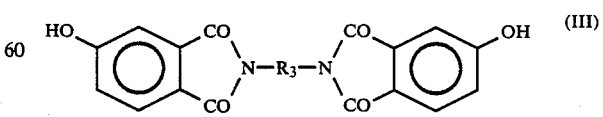

wherein $R_3$ is a difunctional organic radical residue selected from the group consisting of diphenylmethane, diphenyl ether, diphenyl sulfone, m-phenylene, p-phenylene and hexamethylene.

* * * * *